(12) United States Patent
Weinstein et al.

(10) Patent No.: US 8,612,375 B2
(45) Date of Patent: *Dec. 17, 2013

(54) DYNAMIC PLAYBOOK: EXPERIMENTATION PLATFORM FOR SOCIAL NETWORKS

(71) Applicant: WETPAINT.COM, Inc., Seattle, WA (US)

(72) Inventors: Alex David Weinstein, Bellevue, WA (US); Bo Steven Finneman, Los Angeles, CA (US); Christopher Edgar Newell, Seattle, WA (US); Werner Koepf, Bellevue, WA (US); Dmitry Frenkel, Bothell, WA (US)

(73) Assignee: WETPAINT.COM, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,102

(22) Filed: Nov. 9, 2012

(65) Prior Publication Data

US 2013/0123020 A1    May 16, 2013

Related U.S. Application Data

(60) Provisional application No. 61/558,815, filed on Nov. 11, 2011.

(51) Int. Cl.
*G06F 17/00* (2006.01)
*G06Q 30/00* (2012.01)

(52) U.S. Cl.
USPC ..... 706/47; 705/14.41; 705/14.68; 705/14.72

(58) Field of Classification Search
None
See application file for complete search history.

(56) References Cited

U.S. PATENT DOCUMENTS 7,660,869 B1    2/2010 Kitts
(Continued)

FOREIGN PATENT DOCUMENTS

| KR | 10-2001-0074279 A | 8/2001 |
| KR | 10-2009-0002017 A | 1/2009 |
| KR | 10-2011-0092641 A | 8/2011 |

OTHER PUBLICATIONS van Belle, Gerald; Statistical Rules of Thumb, Second Edition, Chapter 2: Sample Size; Wiley Series in Probability and Statistics; John Wiley & Sons, Published Sep. 2, 2008; Accessed Feb. 5, 2013 at http://www.vanbelle.org/chapters/webchapter2.pdf.

(Continued)

*Primary Examiner* — Jeffrey A Gaffin
*Assistant Examiner* — Paulinho E Smith
(74) *Attorney, Agent, or Firm* — Frommer Lawrence & Haug LLP; John W. Branch

(57) ABSTRACT

Embodiments are directed towards dynamically managing contextual recommendations that can be employed with content when provided to a channel. A test for a variable having at least two outcomes may be determined to be employed with selected content. Each outcome may correspond to a different contextual recommendation. An outcome to employ with the content may be randomly determined/selected such that each of the outcomes of the test is selected a substantially similar number of times. The content may be modified and/or provided to the channel based on contextual recommendations that correspond to the determined outcome. Actions associated with a plurality of content may be monitored and/or analyzed to determine metrics for each outcome of a test. A comparison of the metrics for each outcome may be utilized to determine a preferred outcome for the test.

27 Claims, 8 Drawing Sheets

(56) References Cited

U.S. PATENT DOCUMENTS

| | | | |
|---|---|---|---|
| 8,112,312 | B2 | 2/2012 | Ritter |
| 8,365,062 | B2 | 1/2013 | Seolas et al. |
| 2003/0120641 | A1 | 6/2003 | Pelletier |
| 2003/0158780 | A1* | 8/2003 | Isobe et al. .................. 705/14 |
| 2005/0028188 | A1* | 2/2005 | Latona et al. .................. 725/13 |
| 2005/0159921 | A1 | 7/2005 | Louviere et al. |
| 2008/0077955 | A1 | 3/2008 | Haberman |
| 2008/0091516 | A1* | 4/2008 | Giunta .................. 705/10 |
| 2008/0201225 | A1 | 8/2008 | Maharajh et al. |
| 2008/0209343 | A1 | 8/2008 | Macadaan et al. |
| 2009/0132435 | A1 | 5/2009 | Titus et al. |
| 2009/0158179 | A1 | 6/2009 | Brooks |
| 2009/0163183 | A1 | 6/2009 | O'Donoghue et al. |
| 2009/0210899 | A1* | 8/2009 | Lawrence-Apfelbaum et al. .................. 725/34 |
| 2010/0174671 | A1 | 7/2010 | Brooks et al. |
| 2010/0251304 | A1 | 9/2010 | Donoghue et al. |
| 2013/0219282 | A1 | 8/2013 | Weinstein et al. |

OTHER PUBLICATIONS

University of Regina; Table of t Distribution; Copyright 2012; Accessed Feb. 5, 2013 at http://uregina.ca/~gingrich/tt.pdf.

International Search Report and Written Opinion in International Application No. PCT/US2013/024922 mailed May 30, 2013.

Official Communication for U.S. Appl. No. 13/759,562 mailed on May 29, 2013.

International Search Report and Written Opinion for PCT/US2012/064390, mailed Mar. 19, 2013.

Official Communication in U.S. Appl. No. 13/708,566, mailed Apr. 8, 2013.

Official Communication for U.S. Appl. No. 13/797,452 mailed Jul. 22, 2013.

Li et al., "Internet Advertising Formats and Effectiveness," Oct. 2004, pp. 1-31.

Official Communication for U.S. Appl. No. 13/708,566 mailed Sep. 27, 2013.

Official Communication for U.S. Appl. No. 13/759,562 mailed Sep. 26, 2013.

* cited by examiner

Scheduling A/B Test

800

802 — Channel: Channel XYZ

804 — A/B Test: Include the word "you" in preview text

806 — ☐ Opt out of Test

808 — Preferred Contextual Recommendations:
- Font color - Red
- Include a question in preview text
⋮
- Include image 810 — Content Preview text                    [Font]

What do you think will happen in the next season of TV SHOW A?

[Include Image]

812 — When to post content to Channel:
○ Queued
○ Hidden
◉ Scheduled
○ Posted

Scheduled time to post: 09/26/2011 09:30 AM PST

[Cancel]   [Save]

DYNAMIC PLAYBOOK: EXPERIMENTATION PLATFORM FOR SOCIAL NETWORKS

CROSS REFERENCE TO RELATED APPLICATIONS

This non-provisional patent application claims the benefit under 35 U.S.C. §119(e) of U.S. Provisional Patent Application Ser. No. 61/558,815 filed on Nov. 11, 2011, entitled "Dynamic Playbook: Experimentation Platform for Social Networks," which is incorporated herein by reference.

TECHNICAL FIELD

The present invention relates generally to content management, and more particularly, to dynamically experimenting with multiple contextual recommendations to employ with content to determine preferred contextual recommendations.

BACKGROUND

Today, many brands provide content to their audience through one or more channels. These channels range from email distribution lists to social media web pages. Sometimes, brands may provide different content to different audiences. However, audiences may vary widely in their preferences for how content is provided to them. For example, one audience may prefer an image with the content, while another audience may prefer no image. If an audience has a preference for images, but the brand does not provide images, then the audience may lose interest in the brand. As a result, the uninterested reader may torn to a different a different brand and/or media property in the future. Accordingly, the way in which content is provided to an audience and the preferences of that audience can impact an engagement level of the audience; referral and/or retention rates; return on investment, or the like. It is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 8 shows a use ease illustration of an embodiment of a graphical user interface that may be employed to select contextual recommendations to apply to content.

DETAILED DESCRIPTION

Figure 1:
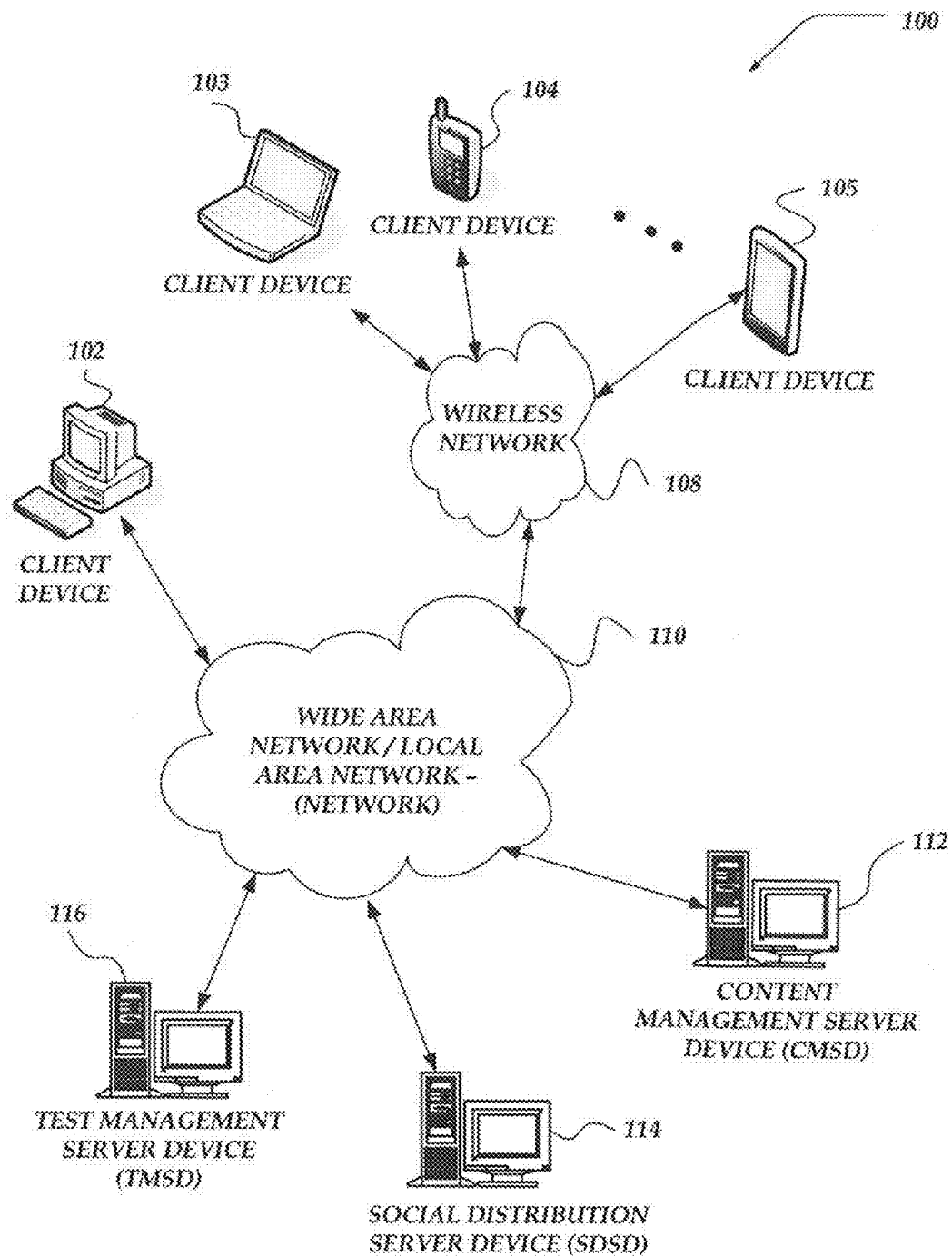
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "of" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" refers to digital data that may be communicated over a network to be remotely displayed by a computing device. Non-exhaustive examples of content include but are not limited to articles, blogs, movies, videos, music, sounds, pictures, illustrations, graphics, images, text, or the like. Content may also include summaries, briefs, snippets, headlines, or the like, of the content. In at least one embodiment, content may also include links, hyperlinks, or the like, to additional content. For example, a piece of content may be a post to a social media page, where the post includes a heading and a link to an article. In some embodiments, each piece of content may include one or more features. These features may include, for example, a subject, topic, theme, trend, character, person, topic, keyword, date of creation, author, publisher/poster, or the like. In at least one of various embodiments, the features of a piece of content may also include traffic achieved for the content on a channel (i.e., a channel that the content is posted/provided).

As used herein, the term "channel" refers to a method of providing and/or otherwise distributing content from a publisher to a user. Channels may include, but are not limited to, email messages, text messages, web pages, social media pages, social media messages, physical mailings, telephone calls, or the like. Non-limiting, non-exhaustive examples of providing content to a user through a channel may include posting content or a link to content on a social media page, sending an email with content to a user, or the like. In some embodiments, users may subscribe to a channel by requesting content from a publisher through a channel, by signing up with a channel (e.g., signing up with an email distribution list), becoming a member of the channel (e.g., becoming a member of the publisher's social media page), or the like. Subscribing to a channel may be free or may include a monetary cost, which may be charged to a user and/or offset by advertising. In some embodiments, content may be posted and/or otherwise provided to a channel for one or more users. In other embodiments, content may be provided through a channel to one or more users.

As used herein, the term "test," "contextual recommendation test," and/or "test for a variable" may refer to an operation employed to determine a preferred outcome from a plurality of outcomes. Each outcome of a test may correspond to a different contextual recommendation that can be employed with a piece of content. A preferred outcome may be an outcome of a test (after that test was employed with a plurality of different pieces of content) that performed better than another outcome, achieved more positive results than another outcome, or the like. In at least one embodiment, the test may be in the form on an A/B test with outcome_A and outcome_B, also referred to as a first outcome and second outcome, respectively.

As used herein, the phrase "contextual recommendation" may refer to an aspect, characteristic, and/or substance of a piece of content that can be modified. In some embodiments, contextual recommendations may be provided to a social marketer, which may be utilized to employ the contextual recommendation. In at least one embodiment, contextual recommendations may indicate how the content should be displayed to a user. For example, in some embodiments, the contextual recommendation may indicate a format of the content, such as, for example, font color, font size, capitalization utilization, image size, image quality, or the like. However, in other embodiments, the contextual recommendation may indicate whether or not to include an image, whether an audience poll is including with the content, whether the content should be provided in the form of a question, or the like. In another embodiment, the contextual recommendations may indicate a keyword to include with the content, such as, for example, "breaking news," "just in," or the like. These keywords may also include a name associated with the content, such as person discussed in the content, a show/episode title, article title, or the like.

As used herein, the term "playbook" may refer to a list of one or more plays. A "play" or "marketing play," as used herein, may refer to an outcome and/or a preferred outcome determined from a test. In at least one embodiment, a play may be a contextual recommendation that may be utilized to modify a piece of content. In another embodiment, a play may indicate which of a plurality of channels to provide a piece of content (e.g., through a social media page, by email distribution, or the like).

The following briefly describes embodiments of the invention in order to provide a basic understanding of some aspects of the invention. This brief description is hot intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to dynamically managing contextual recommendations that can be employed with content when the content is provided to a channel. Since content can be provided to users in a plurality of different ways, from font colors to keywords, to sentence structure, and the like, it may be beneficial to determine which ways perform better than others for different groups of users. Typical A/B testing creates two versions of the same content, where each version is provided to different subsets of users. However, many channels, especially social networking channels, do not enable publishers to control multiple versions of content and/or control which users see which version of content. Various embodiments described herein are directed towards employing at least one test for a variable having at least two outcomes, such that each of a plurality of selected pieces of content is employed with one of the outcomes.

In some embodiments, a plurality of tests can be generated. Each test may include a plurality of different outcomes, where each outcome may correspond to a different contextual recommendation. Tests can be generated and employed for specific audiences, for content that has specific features, for specific channels, or the like. For example, one test may be employed to determine whether red font or green font is preferred by users that access content regarding sports, while another test may be employed to determine whether a particular audience prefers images as part of the content or not. In some other embodiments, a test can be employed for multiple different channels and/or audiences.

A test and associated outcome may be determined to be employed with selected content. The/content may be provided to the channel based on the determined test/outcome. In at least one embodiment, the content may be modified based on contextual recommendations that correspond to the determined outcome. In another embodiment, the channel that the content is provided may be selected based on the determined outcome. In some embodiments, each piece of a plurality of content may employ a test, where a subset of the plurality of content is employed with a first outcome and a different subset is employed with a second outcome. In at least one embodiment, an outcome to employ with the content may be randomly selected such that each of the outcomes of the test is selected a substantially similar number of times.

In at least one embodiment actions associated with the plurality of content may be monitored and/or analyzed. These monitored actions may include clicks on the content accessing the content, sharing the content, or the like. In some embodiments, metrics for each outcome may be determined based on the actions. The metrics may include, but are not limited to, total number of clicks, average number of clicks (e.g., per day), total number of times the content was shared with a user that does not have access to the channel, or the like. Based on these metrics, a preferred outcome for the test may be determined based on a comparison of metrics for each outcome.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client devices 102-105. Content Management Server Device (CMSD) 112, Social Distribution Server Device (SDSD) 114, and Test Management Server Device (TMSD) 116.

At least one embodiment of client devices 102-105 is described in more detail below in conjunction with FIG. 2. In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment one or more of client devices 102-105 may be configured to operate within a business or other entity to perform a variety of services for the business or other entity. For example, client devices 102-105 may be configured to operate as a web server, an accounting server, a production server, an inventory server, or the like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless communications medium such as personal computers, multiprocessor systems, microprocessor-based or programmable electronic devices, network PCs, or the like. In some embodiments, client devices 102-105 may include virtually any portable personal computing device capable of connecting to another computing device and receiving information such as, laptop computer 103, smart mobile telephone 104, and tablet computers 105, and the like. However, portable computing devices are not so limited and may also include other portable devices such as cellular telephones, display pagers, radio frequency (RF) devices, infrared (IR) devices. Personal Digital Assistants (PDAs), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

A web-enabled client device may include a browser application that is configured to receive and to send web pages, web-based messages, and the like. The browser application, may be configured to receive and display graphics, text, multimedia, and the like, employing virtually any web-based language, including a wireless application protocol messages (WAP), and the life. In one embodiment, the browser application is enabled to employ Handheld Device Markup Language (HDML), Wireless Markup Language (WML), WMLScript, JavaScript, Standard Generalized Markup Language (SGML), Hypertext Markup Language (HTML), extensible Markup Language (XML), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send content between another computing device. The client application may include a capability to send, receive, and/or otherwise access content, or the like. The client application may further provide information that identifies itself, including a type, capability, name, and the like. In one embodiment, client devices 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client devices, SDSD 114, or other computing devices.

Client devices 102-105 may further be configured to include a client application that enables an end-user to log into an end-user account that may be managed by another computing device, such as SDSD 114, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection for client devices 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobil communication (GSM), General Packet Radio Services (GPRS), Enhanced Data. GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client devices 103-105 and another computing device, network, and the like.

Network 110 is configured to couple network devices with other computing devices, including CMSD 112, SDSD 114, TMSD 116, client device 102, and client devices 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, OS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of CMSD 112 is described in more detail below in conjunction with FIG. 3. Briefly, however, CMSD 112 includes virtually any network device capable of managing a plurality of content. In at least one embodiment, CMSD 112 may manage individual pieces of content. In some embodiments, CMSD 112 may manage and/or store which channel(s) the content has been provided. In other embodiments, CMSD 112 may store an identifier of a test and associated outcome that was employed with each piece of content. In yet other embodiments, CMSD 112 may store metrics associated with the content, such as, but not limited to, a number of times the content was accessed by a user, how long a user accessed the content, whether a user shared the content, features of the content, comments and/or posts provided by users about the content, or the like.

Devices that, may be arranged to operate as CMSD 112 include various network, devices, including, but not limited to personal computers, desktop computers, multiprocessor systems, microprocessor-based or programmable consumer electronics, network PCs, server devices, network appliances, and the like.

Although FIG. 1 illustrates CMSD 112 as a single computing device, the invention is not so limited. For example, one or more functions of the CMSD 112 may be distributed across one or more distinct network devices. Moreover, CMSD 112 is not limited to a particular configuration. Thus, in one embodiment, CMSD 112 may contain a plurality of network devices. In another embodiment, CMSD 112 may contain a plurality of network-devices that operate using a master/slave approach, where one of the plurality of network devices of CMSD 112 operates to manage and/or otherwise coordinate operations of the other network devices. In other embodiments, the CMSD 112 may operate as a plurality of network devices within a cluster architecture, a peer-to-peer architecture, and/or even within a cloud architecture. Thus, the invention is not to be construed as being limited to a single environment, and other configurations, and architectures are also envisaged.

One embodiment of SDSD 114 is described in more detail below in conjunction with FIG. 3. Briefly, however, SDSD 114 includes virtually any network device capable of posting and/or otherwise providing content to a channel. SDSD 114 may be enabled to communicate with CMSD 112. In at least one embodiment, SDSD 114 may receive content from CMSD 112. In some embodiments, SDSD 114 may monitor and/or collect actions provided by users on the content, such as a number of clicks, user comments, or the like. In some embodiments, SDSD 114 may be enabled to analyze the monitored actions to determine one or more metrics about a test/outcome associated with a piece of content. In at least one embodiment, SDSD 114 may provide the monitored actions and/or the determined metrics to CMSD 112 for storage.

In some embodiments, SDSD 114 may determine which tests/outcomes are to be employed with a piece of content. In other embodiments, SDSD 114 may enable a marketing administrator to select, add, and/or modify content, based on the outcomes (i.e., the contextual recommendations). In at least one embodiment, SDSD 114 may be enabled to communicate with TMSD 116 to access tests and/or corresponding outcomes. In some other embodiments, SDSD 114 may schedule and/or re-schedule tests to be employed with content.

Devices that may be arranged to operate as SDSD 114 include various network devices, including, but not limited to personal computers, desktop computers, multiprocessor systems, microprocessor-based or programmable consumer electronics, network PCs, server devices, network appliances, and the like.

Although FIG. 1 illustrates SDSD 114 as a single computing device, the invention is not so limited. For example, one or more functions of the SDSD 114 may be distributed across one or more distinct network devices. Moreover, SDSD 114 is not limited to a particular configuration. Thus, in one embodiment, SDSD 114 may contain a plurality of network devices. In another embodiment, SDSD 114 may contain a plurality of network devices that operate using a master/slave approach, where one of the plurality of network devices of SDSD 114 operates to manage and/or otherwise coordinate operations of the other network devices. In other embodiments, the SDSD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

One embodiment of TMSD 116 is described in more detail below in conjunction with FIG. 3. Briefly, however, TMSD 116 includes virtually any network device capable of creating, storing, deleting, and/or otherwise managing one or more tests arm their associated outcomes. In at least one embodiment, TMSD 116 may store and/or generate metrics associated with each test based on monitored actions (e.g., by SDSD 114).

Devices that may be arranged to operate as TMSD 116 include various network devices, including, but not limited to personal computers, desktop computers, multiprocessor systems, microprocessor-based or programmable consumer electronics, network PCs, server devices, network appliances, and the like.

Although FIG. 1 illustrates TMSD 116 as a single computing device, the invention is not so limited. For example, one or more functions of the TMSD 116 may be distributed across one or more distinct network devices. Moreover, TMSD 116 is not limited to a particular configuration. Thus, in one embodiment, TMSD 116 may contain a plurality of network devices. In another embodiment, TMSD 116 may contain a plurality of network devices that operate using a master/slave approach, where one of the plurality of network devices of TMSD 116 operates to manage and/or otherwise coordinate operations of the other network devices. In other embodiments, the TMSD 116 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
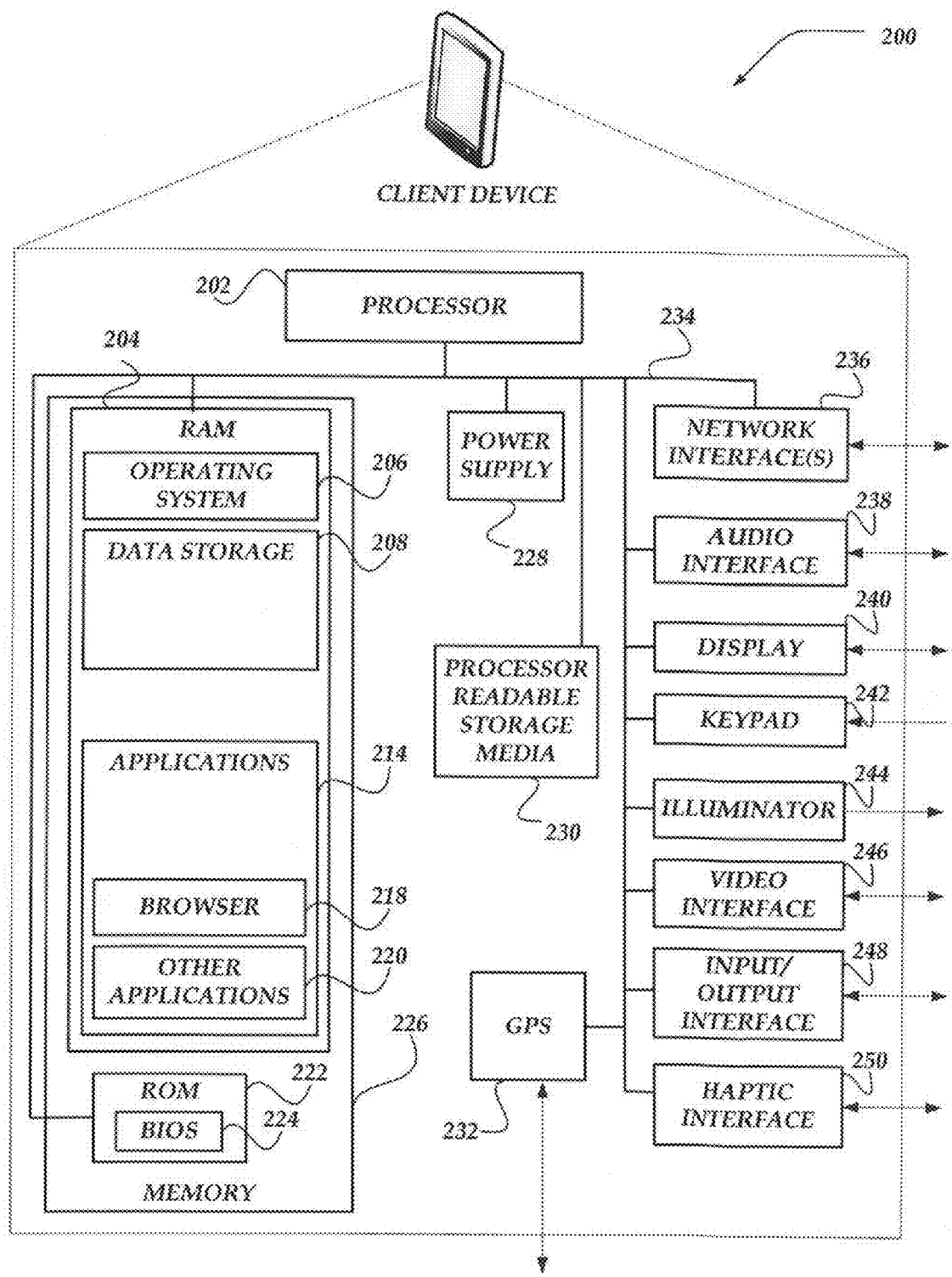
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose aft illustrative embodiment for practicing the present invention. Client device 200 may represent, for example, one embodiment of at least one of client devices 102-105 of FIG. 1.

As shown, in the figure, client device 200 includes a processor 202 in communication with a mass memory 226 via a bus 234. In some embodiments, processor 202 may include one or more central processing units (CPU). Client device 200 also includes a power supply 228, one or more network interfaces 236, an audio interface 238, a display 240, a keypad 242, an illuminator 244, a video interface 246, an input/output interlace 248, a haptic interface 250, and a global positioning system (GPS) receiver 232.

Power supply 228 provides power to client device 200. A rechargeable or non-rechargeable battery may be used to provide power. The power may also be provided by an external power source, such as an alternating current (AC) adapter or a powered docking cradle that supplements and/or recharges a battery.

Client device 200 may optionally communicate with abase station (not shown), or directly with another computing device. Network interface 236 includes circuitry for coupling client device 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network, interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interlace 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client device 200 also comprises input/output interface 248 for communicating with external devices, such as a headset or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client device. For example, the haptic interface 250 may be employed to vibrate client device 200 in a particular way when another user of a computing device is calling. In some embodiments, haptic interlace 250 may be optional.

Client device 200 may also include GPS transceiver 232 to determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control (MAC) address, IP address, or the like.

Mass memory 226 includes a Random. Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client device 200. The mass memory also stores an operating system 206 for controlling the operation of client device 200. It will be appreciated, that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, web page content or my of a variety of user generated content. At least a portion of the information may also be stored on another component of network device 200, including, but not limited to processor readable storage media 230, a disk drive or other computer readable storage devices (not shown) within client device 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. Processor readable storage media 230 may also be referred to herein as computer readable storage media and/or computer readable storage device.

Applications 214 may include computer executable instructions which, when executed by client device 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client device. Applications 214 may include, for example, browser 218, and other applications 220. Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, messages, other content, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to communicate with another network device, such as CMSD 112, SDSD 114, and/or TMSD 116 of FIG. 1.

Illustrative Network Device

Figure 3:
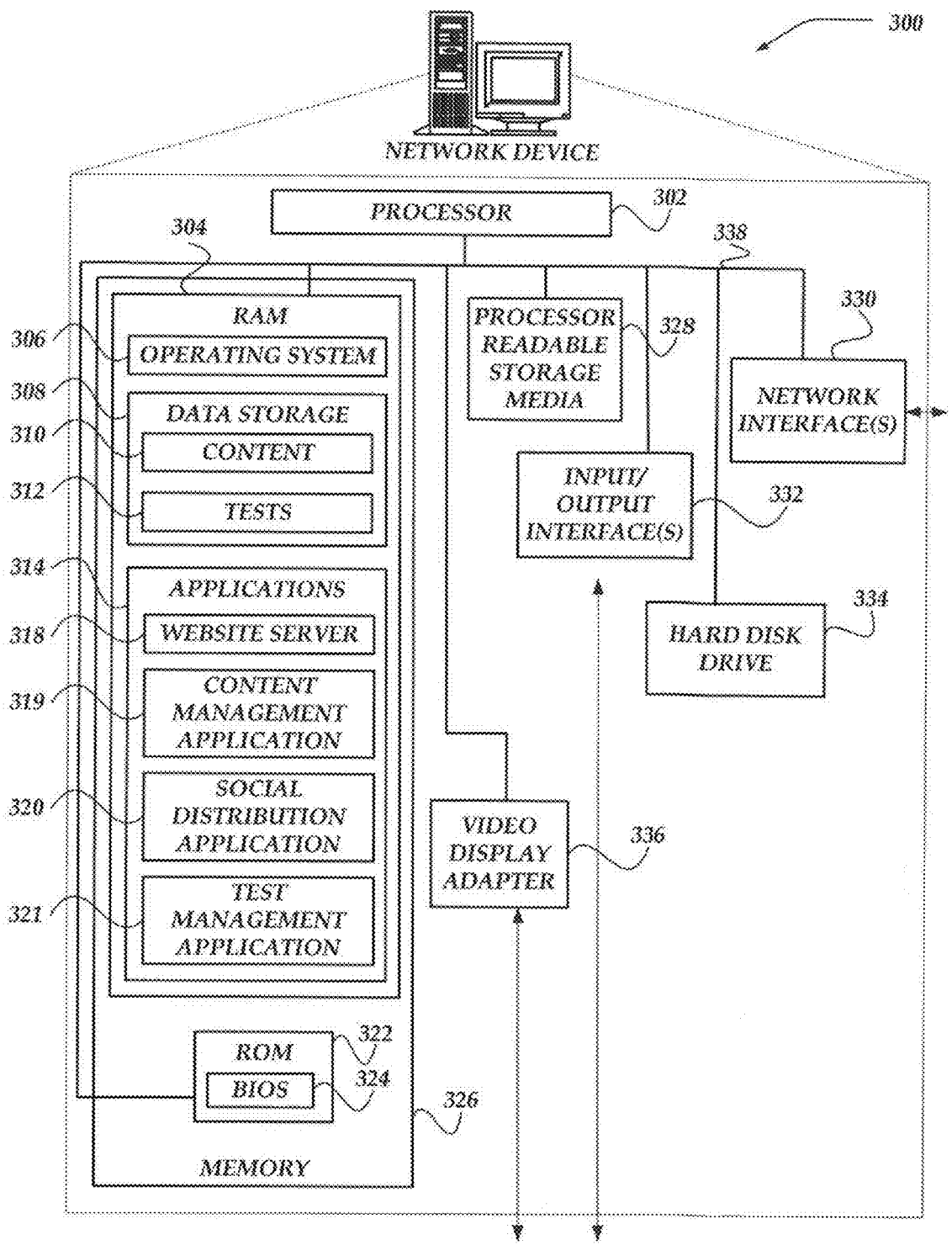
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example CMSD 112, SDSD 114, TMSD 116 of FIG. 5, and/or other network devices.

Network device 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output, interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation, of network device 300. Any general-purpose operating system may be employed. Basic input/output system (BIOS) 324 is also provided for controlling the low-level operation of network device 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital, versatile disks (DVD) or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like. At least a portion of the information may also be stored on another component of network device 300, including, but not limited to processor readable storage media 328, hard disk drive 334, or other computer readable storage medias (not shown) within client device 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network device 300, including, but not limited to processor-readable storage media 328, hard disk drive 334, or the like.

Data store 308 may also include content 310 and tests 312. Content 310 may include a plurality of pieces of content. In some embodiments, content 310 may include other data associated with each piece of content, such as, for example, a history of actions performed by users on the content, a test/outcome employed with the content, features of the content, or the like. In at least one embodiment content may be associated with a unique identifier. In some embodiments, the unique identifier may be utilized to obtain and/or store actions associated with the content. Tests 312 may include a plurality of tests. In some embodiments, tests 312 may include currently executing tests, historical tests that are not currently being executed, schedule of tests to be executed, metrics associated with a test, or the like.

Applications 314 may include computer executable instructions, which, may be loaded into mass memory and run on operating system 306. Examples of application programs may include transcoders, schedulers, calendars, database programs, word processing programs, Hypertext Transfer Protocol (HTTP) programs, customizable user interface programs, IPSee applications, encryption programs, security programs, SMS message servers, IM message servers, email servers, account managers, and so forth. Applications 314 may also include website server 318, Content Management Application (CMA) 319, Social Distribution Application (SDA) 320, and Test Management Application (TMA) 321.

Website server 318 may represents any of a variety of information and services that are configured to provide content, including messages, over a network to another computing device. Thus, website server 318 can include, for example, a web server, a File Transfer Protocol (FTP) server, a database server, a content server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

CMA 319 may be configured to manage a plurality of content, such as content 310. In at least one embodiment CMA 319 may manage content as described above in conjunction with CMSD 112 of FIG. 1. In some embodiments, CMA 319 may be employed by CMSD 112 of FIG. 1. In any event, CMA 319 may employ processes, or parts of processes, similar to those described in conjunction with FIGS. 4-6, to perform at least some of its actions.

SDA 320 may be configured to provide/distribute content to a channel, as described above in conjunction with SDSD 114 of FIG. 1. In some embodiments, SDA 320 may be enabled to employ tests with content, provide content to channels, monitor actions associated with the content, or the like. In at least one embodiment, these actions may be detected by a third party or a dedicated web server, which may produce reports of the actions associated with a piece of content (as identified by a unique identifier). In other embodiments, SDA 320 may calculate and/or determine metrics for each outcome of each of a plurality of tests. In some embodiments, SDA 320 may be employed by SDSD 114 of FIG. 1. In any event, SDA 320 may employ processes, or parts of processes, similar to those described in conjunction with FIGS. 4-6, to perform at least some of its actions.

TMA 321 may be configured to manage a plurality of tests, such as tests 312. In at least one embodiment TMA 321 may manage tests as described above in conjunction with TMSD 116 of FIG. 1. In some embodiments, TMA 321 may be employed by TMSD 116 of FIG. 1. In any event, TMA 321 may employ processes, or parts of processes, similar to those described in conjunction with FIGS. 4-6, to perform at least some of its actions.

General Operation

Figure 4:
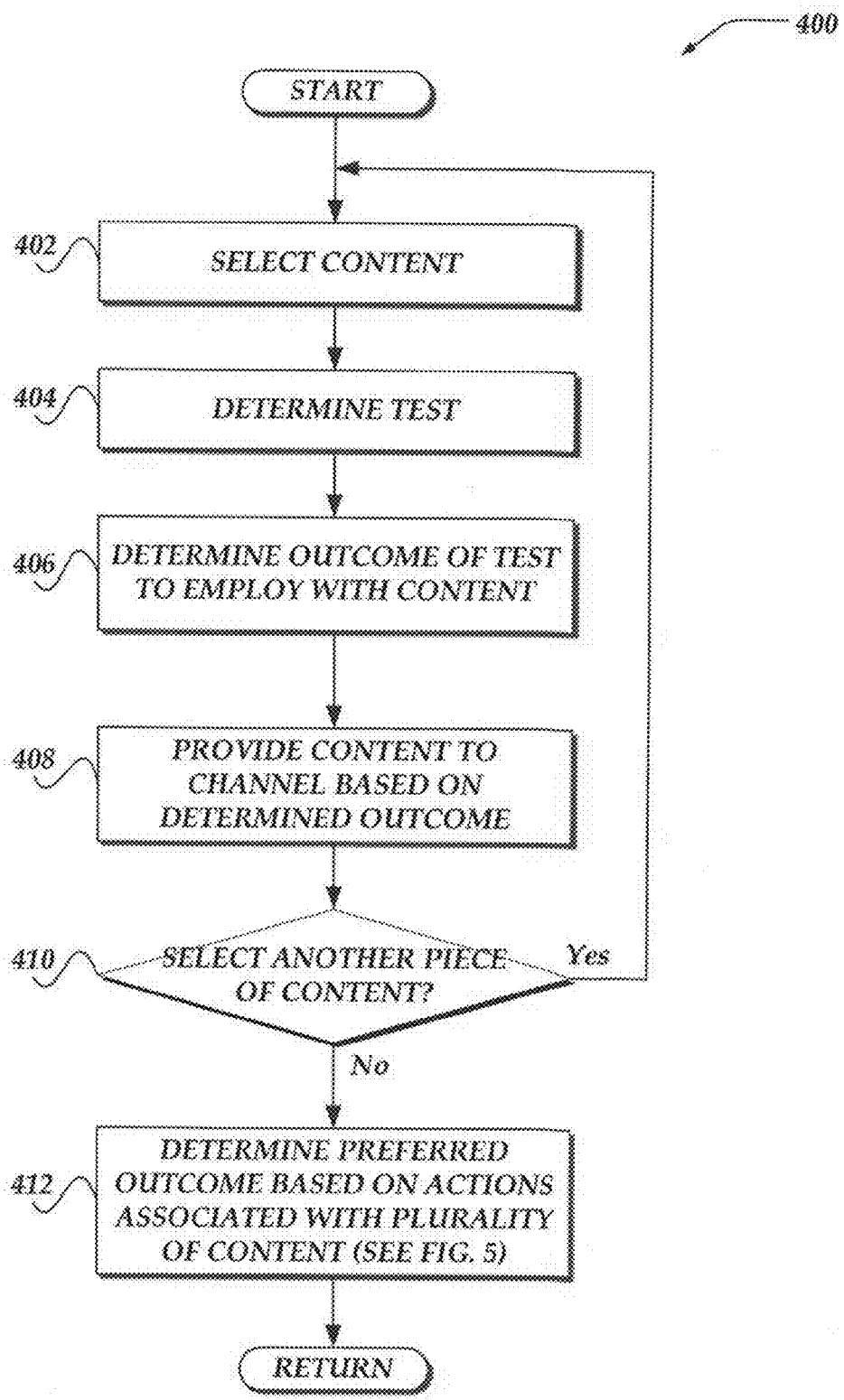
FIG. 4 illustrates a logical flow diagram generally showing one embodiment of an overview process for providing content to a channel based on a determined test and an associated outcome.

The operation of certain aspects of the invention will now be described with respect to FIGS. 4-6. FIG. 4 illustrates a logical flow diagram generally showing one embodiment of an overview process for providing content to a channel based on a determined test and an associated outcome. In some embodiments, process 400 of FIG. 4 may be implemented by and/or executed on a single network device, such as network device 300 of FIG. 3. In other embodiments, process 400 or portions of process 400 of FIG. 4 may be implemented by and/or executed on a plurality of network devices, such as network device 300 of FIG. 3.

Process 400 begins, after a start block, at block 402, where a piece of content may be selected. In at least one embodiment, the content may be selected by a publisher, editor, audience development staff, marketing team, or the like. In some embodiments, the content may be selected from a plurality of different possible content that may be provided to a user (also referred to herein as a reader and/or audience). For example, a plurality of possible contest may include, but is not limited to, "today's top stories," content regarding breaking news, most popular content among readers, editorially-curated content of special importance, randomly selected content, or the like.

In at least one embodiment, content may be selected when it is generated and/or created. In another embodiment, content may be selected randomly, at predetermined times, at periodic time intervals, or the like. For example, in one embodiment, two pieces of content may be selected per channel per day. In some embodiments, process 400 may be employed for a plurality of content that may be provided to users, such that each piece of content may be selected at block 402.

In some embodiments, selection of apiece of content may also include selection of one or more channels for providing the content. In various embodiments, the channel may be determined based on one or more features associated with the selected content. In at least one embodiment, each channel may include one or more characteristics about a corresponding channel. In some embodiments, the characteristics may describe the content associated with a channel. For example, a channel may be characterized as "United States economy", which may indicate that a majority of the content posted to the channel include the feature "United States economy." In at least one of various embodiments, the characteristics of a channel may be compared to the features of the selected content to determine if the content may be provided to that channel.

In any event, process 400 proceeds next to block 404, where a test for a variable may be determined. In at least one embodiment, each piece of content (e.g., each post) may employ a test. In at least one embodiment, the test for the variable may have and/or include a plurality of outcomes. In at least one of various embodiments, the test may be an A/B test having a first outcome (outcome_A) and a second outcome (outcome_B), where the A/B test may assess which outcome is preferred over the other outcome.

As described above, each outcome of a test may indicate how a piece of content should be provided to a user, e.g., a contextual recommendation that can be employed with a piece of content. In some embodiments, the outcomes of a test may be determined and/or defined by, for example, a publisher, marketing administrator, or the like. Outcomes can include a variety of different ways to display and/or provide content to users. Examples of outcomes include, but are not limited to, capitalize words in a headline, include the word "you" or other keywords in teaser text, include a poll in the teaser text, include a question in the headline, employ a specific font color/size, include an image, employ a specific image size/quality, or the like, or any combination thereof. In some embodiments, tire outcomes of a test may be determined/created by a publisher, marketing administrator, or the like. In other embodiments, the outcomes of a test may be automatically determined/created based on monitored actions of previously provided content. For example, the monitored actions may utilize click counts to indicate words, phrases, formats, or other contextual recommendations to include as outcomes.

In at least one of various embodiments, the test may be randomly selected from a plurality of different tests for other variables. In some embodiments, each of the plurality of different tests may have a plurality of outcomes. An outcome of one test may be exclusive to that test or may be common to one or more other tests. In other embodiments, each test may identify one or more predetermined channels, groups of users, or the like, to determine when to employ the test. For example, one test may be employed with content provided to a sports channel, while another test may be employed with content provided to a political channel or a breaking news channel.

In some embodiments, the test may be determined based on channels associated with the test and channels associated/selected with the selected content. For example, if the content is associated with a sports channel, then a test that may be employed on a sports channel may be selected. In other embodiments, the test may be determined based on one or more features of the content. For example, if the content includes the feature breaking news, then a test that may be employed on breaking news content may be selected. However, embodiments are not so limited and other methods for determining which of a plurality of tests to employ. For example, in other embodiments, tests may be selected based on a time of day when die content is to be provided to the channel. In yet other embodiments, the test may be employed for one or more groups of users (i.e., audiences).

In some other embodiments, a plurality of tests may be employed for the selected piece of content. In at least one such embodiment, an outcome for each test may be determined at block 406, as described below.

Process 400 next proceeds to block 406, where an outcome to be employed with the selected content may be determined. In at least one embodiment, a single outcome from the plurality of outcomes associated with the test may be determined and/or selected. For example, if the test is an A/B test, then the determined outcome may be the first outcome or the second outcome, but not both. In other embodiments, however, multiple outcomes may be selected such that at least one outcome is not selected.

In various, embodiments, the outcome may be randomly determined from the outcomes associated, with the test (e.g., randomly selected from the group of outcome_A and outcome_B). In at least one such embodiment, the outcome may be randomly selected such that a number of times that each outcomes associated with the test is selected is substantially similar. In other embodiments, the outcome may be determined based on a current sample subset size of each outcome.

As noted above, a test may be determined for a plurality of different pieces of content. This plurality of content may be referred to as the sample space, where the total number of pieces of content may be referred, to as the test size (i.e., a size of the sample space). Embodiments for determining a test size are described in more detail below in conjunction with block 604 of FIG. 6. Briefly, a test may include a test size that corresponds to a minimum threshold number of pieces of content, where the test size may be based on a predetermined statistical confidence level for determining a preferred outcome from the outcomes associated with the test.

In at least one embodiment, the test size may be separated into multiple different sample subsets sizes such that each sample subset size is relatively equal, substantially similar, and/or within a predetermined threshold and/or tolerance (e.g., +/−one). For example, assume a test size of 21, outcome_A sample subset size may be equal to 11 and outcome_B sample subset size may be equal to 10. Thus, in at least one embodiment, after 21 pieces of content are employed with the determined test, 11 pieces of content may have been employed with outcome_A and 10 pieces of content may have been employed with outcome_B.

In some embodiments, a current sample subset size may be a number of times an outcome was employ. Accordingly, when a piece of content is employed with a given outcome, then a current sample subset size for the given outcome may be increased (e.g., by one). In at least one of various embodiments, the outcome may be randomly selected based on each sample subset size and the current sample subset size of each sample subset. Using the example above of a test size of 21, assume outcome_A is randomly selected 11 times and outcome_B is randomly selected seven times. In this example, outcome_B may be selected for the next three pieces of content, so that outcome_A sample subset size equals 11 and outcome_B sample subset size equals 10.

In any event, process 400 proceeds next to block 408, where the content may be provided to a channel based on the determined outcome. In at least one embodiments, the content may be provided to the channel based on the contextual recommendation corresponding to the determined outcome. In some embodiments, the content may be modified based on the contextual recommendation, corresponding to the determined outcome. In at least one embodiment, the content may be modified to include the outcome. For example, if the outcome indicates that a keyword should be included in the content, then the content may be modified to include the keyword. Embodiments for modifying the content based on the determined outcome are described in more detail below in conjunction with block 614 of FIG. 6. In some other embodiments, the channel may be selected based on the outcome.

Process 400 continues at decision block 410, where a determination may be made whether or not to select another piece of content. In some embodiments, this determination may be based on the test size and the current test sample size (i.e., the number of previously selected pieces of content). In at least one embodiment, if the current test sample size is less than the test size then another piece of content may be selected; otherwise, no more content may be selected. If another piece of content may be selected, then process 400 may loop to block 402; otherwise, process 400 may flow to block 412.

At block 412, a preferred outcome may be determined based on actions associated with a plurality of content, which is described in more detail below in conjunction with FIG. 5. Briefly, however, the preferred outcome of the test may be determined from the at least two outcomes of the test based on a comparison of the metric for each of the at least two outcomes. In some embodiments, the preferred outcome may be referred to as best practices for content with features that are the same or similar to features of content that employed the test. In at least one embodiment, actions associated with each of a plurality of content may be analyzed to determine the metric for each outcome associated with the test.

After block 412, process 400 may return to a calling process to perform other actions.

Figure 5:
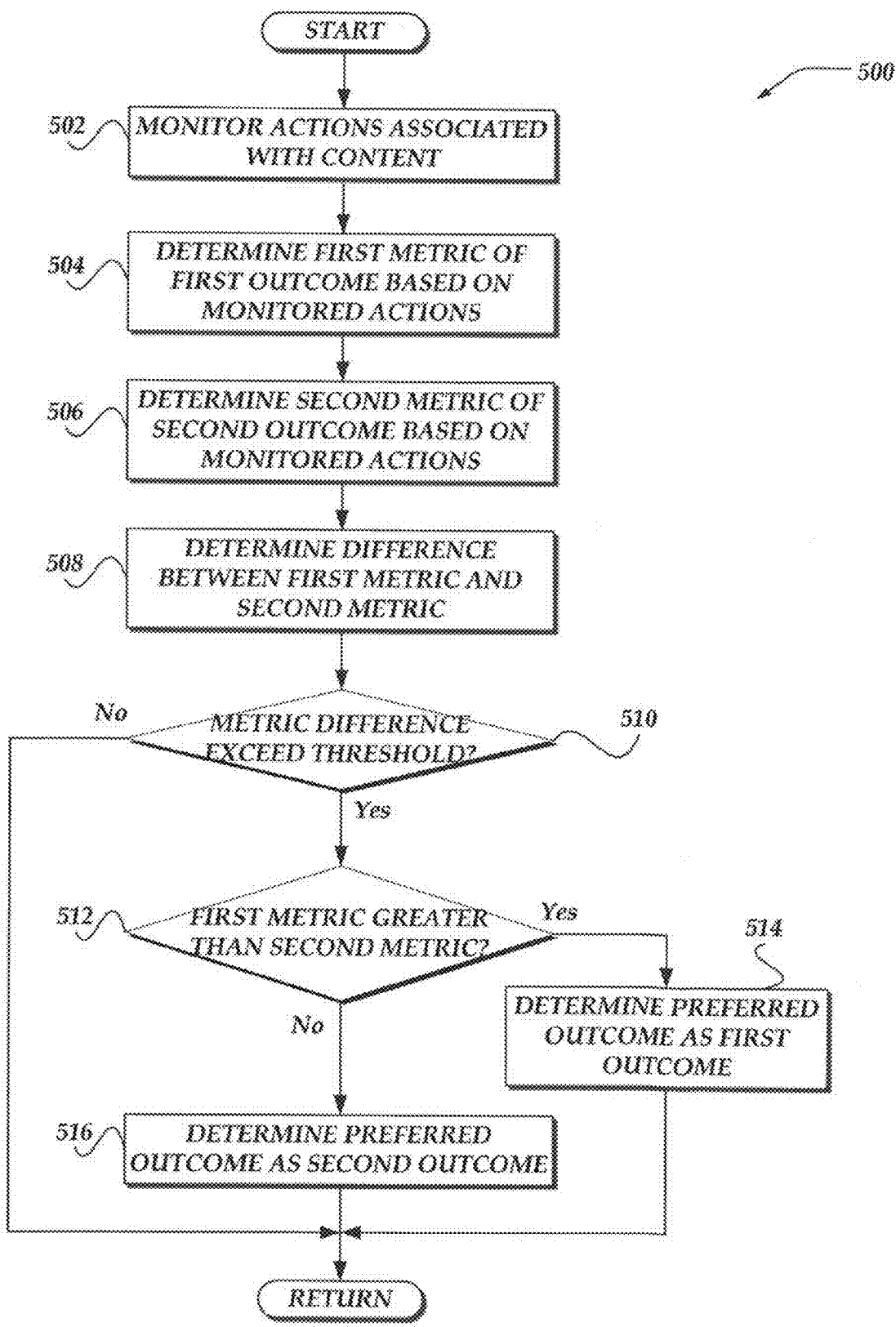
FIG. 5 illustrates a logical flow diagram generally showing one embodiment of a process for determining a preferred outcome of a test.

FIG. 5 illustrates a logical flow diagram generally showing one embodiment of a process for determining a preferred outcome of a test. In some embodiments, process 500 of FIG. 5 may be implemented by and/or executed on a single network device, such as network device 300 of FIG. 3. In other embodiments, process 500 or portions of process 500 of FIG. 5 may be implemented by and/or executed on a plurality of network devices, such as network device 300 of FIG. 3.

Process 500 begins, after a start block, at block 502, where actions associated with content for a test may be monitored. In some embodiments, the actions may include those actions performed by users on the content, such as, for example, accessing the content (e.g., clicking on the content), providing a comment, sharing the content, accessing the content for more than a threshold amount of time, or any combination thereof or the like. In some embodiments, the actions associated with a particular test may be monitored for a predetermined period of time. In at least one embodiment the period of time may be based on a time it takes a current test sample size to reach the test size. For example, if two pieces of content are provided to the channel, per day, then it may take five days to reach a test size of 10.

Process 500 proceeds to block 504, where a first metric for a first outcome may be determined. The first metric may be based on the monitored actions associated with a subset of the content that was provided to the channel based on the first outcome. In at least one embodiment, the metric may be a numerical value, an n-tuple, a qualitative assessment, and/or an indicator of a success/impact that the outcome had on the content. This metric may be compared with other metrics for other outcomes to determine which outcome should be determined as a preferred output (as described in more detail below).

In various embodiments, the metric for an outcome may be determined based on actions associated with a subset of content that employed the outcome. In some embodiments, the metric may be a total number of actions performed on the subset of content. In other embodiments, the metric may be an average number of actions performed on the subset of content for a predetermined time period (e.g., 100 clicks per day). In yet other embodiments, the metric may be an average number of actions performed on each piece of content of the subset of content (e.g., 20 clicks per piece of content). However, embodiments are not so limited and other methods and/or algorithms for calculating metrics for an outcome may be employed.

In some embodiments, the actions may be received by a dynamic play computer system, such as SDSD 114 of FIG. 1, and analyzed to determine which outcomes are the most effective at generating user clicks or for some other, desired response (e.g., sharing the content with other users). As described in more detail below, the system may determine a preferred outcome by ranking outcomes in accordance with the monitored actions. In one embodiment, those outcomes having the best response may be reused (e.g., as preferred outcome) until such time as they no longer become effective (e.g., the average number of clicks falls below a predetermined threshold). The preferred outcomes are therefore most likely to be seen by end users and may enable generation of more revenue for advertisers and for media publishing companies. If a preferred outcome becomes in-effective, the dynamic play computer system may instruct an operator and/or automatically to re-employ a test with the outcome to determine if has become effective again.

In any event, process 500 continues at block 506, where a second metric for a second outcome may be determined. The second metric may be based on the monitored actions associated with a different subset, of the content that was provided to the channel based on the second outcome. In at least one embodiment, block 506 may employ embodiments of block 504 to determine the second metric, but utilizing the second outcome.

Process 500 proceeds next to block 508, where a difference between the first metric and the second metric may be determined. In at least one embodiment, the difference between the metrics may be calculated by subtracting one metric (e.g., the larger metric) from the other metric (e.g., smaller metric). However, embodiments are not so limited and other statistical methods may be employed to determine the difference between, two test groups.

Process 500 continues at decision block 510, where a determination may be made whether the difference between the metrics exceeds a predetermined threshold. In at least one embodiment, the predetermined threshold may be based on a confidence level and/or a statistically significant difference between, the metrics. In at least one embodiment, the confidence level may be based on the confidence level utilized to determine the test size (as described in more detail below in conjunction with block 604 of FIG. 6). If the metric difference exceeds the threshold, then process 500 may flow to decision block 512; otherwise, process 500 may return to a calling process to perform other actions.

At decision block 512, a determination may be made whether the first metric is greater than the second metric. This determination may be utilized to determine which outcome performed better than the other outcome. For example, if the first metric is greater than the second metric, then the first outcome may have performed better than the second outcome. Similarly, if the second metric is greater than the first metric, then the second outcome may have performed better than the first outcome.

After block 512, process 500 may return to a calling process to perform other actions.

Although process 500 employs two outcomes of a test, embodiments are not so limited; but rather, a similar process may be employed for comparing metrics for a plurality of different outcomes (e.g., employ process 500 for each possible combination of two outcomes and stack ranking the metrics to determine the preferred outcome).

Figure 6:
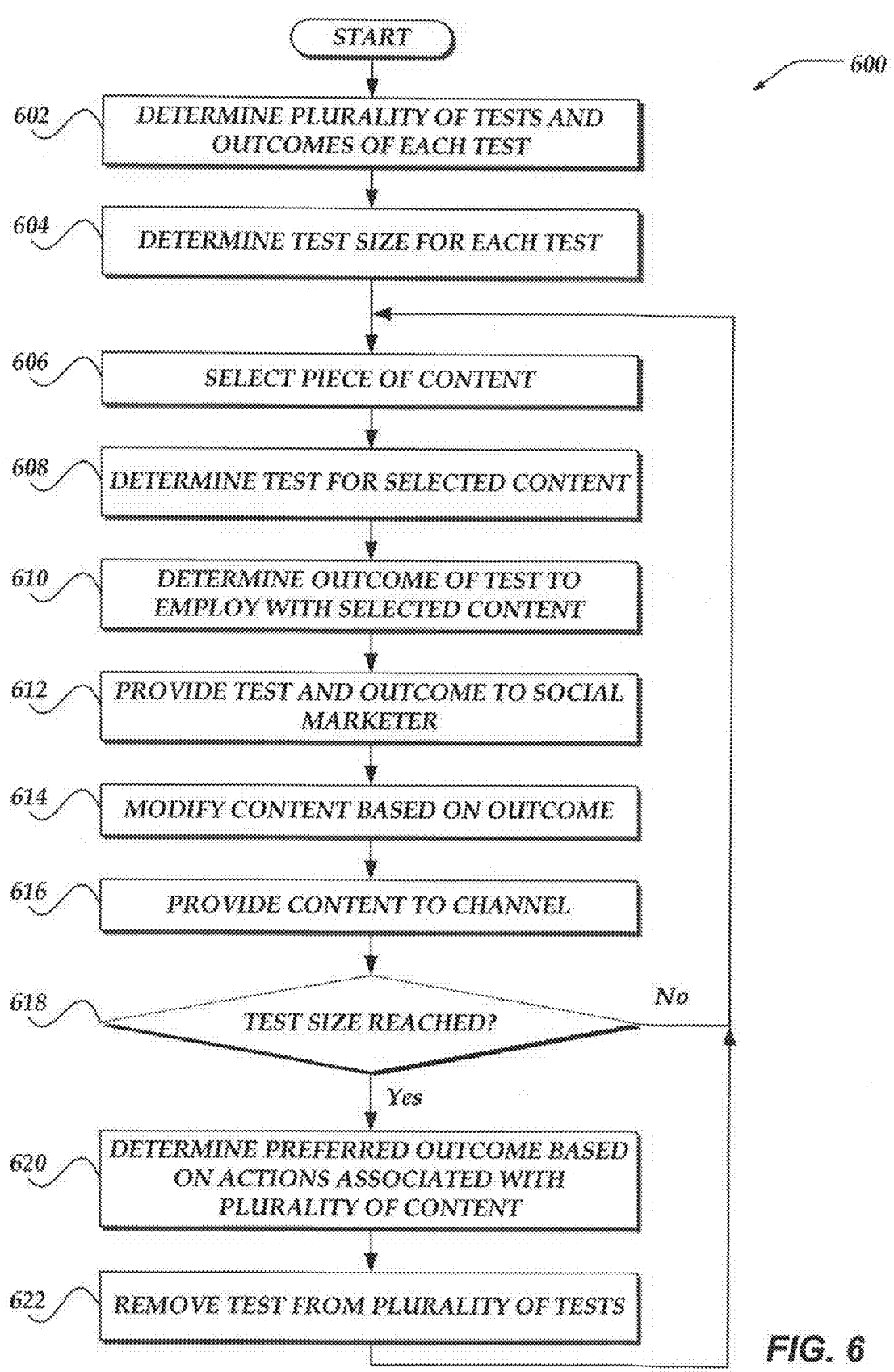
FIG. 6 illustrates a logical flow diagram generally showing an alternative embodiment of a process for providing content to a channel based on a determined test and an associated outcome.

FIG. 6 illustrates a logical flow diagram generally showing an alternative embodiment of a process for providing content to a channel based on a determined test and an associated outcome. In some embodiments, process 600 of FIG. 6 may be implemented by and/or executed on a single network device, such as network device 300 of FIG. 3. In other embodiments, process 600 or portions of process 600 of FIG. 6 may be implemented by and/or executed on a plurality of network devices, such as network device 300 of FIG. 3.

Process 600 begins, after a start block, at block 602, where a plurality of tests for variables may be determined. Each test may include two or more associated outcomes, as described above. In some embodiments, the plurality of outcomes may be generated by a publisher, administrator, or the like. In at least one embodiment, a graphical user interface, such as the one shown in FIG. 7, may be employed to generate a test and the associated outcomes.

Process 600 proceeds to block 604, where a test, size for each test may be determined. In some embodiments, the test size may be a number of pieces of content provided to a channel that employ an outcome of the test to achieve a desired level of confidence while minimizing Type II errors enough to have a needed power to detect desired difference between the outcomes of the test.

An embodiment for determining the test size of an A/B test may be calculated with the following equation:

$$n = \frac{2\left(z_{1-\frac{\alpha}{2}} + z_{1-\beta}\right)^2}{\left(\frac{\mu_0 - \mu_1}{\sigma}\right)^2}$$

where, n may be the number of content instances to employ with a given test, i.e., the test size—thus, in at least one embodiment, the sample set size for one outcome may be at least the ceiling(n/2) and/or the sample set size of the other outcome may be at least the floor(n/2);

$z_1$ may be the z-score, which may be looked up in a standard Z-function table;

$\sigma^2$ may be the common variance between the first and second outcomes;

$\alpha$ may be the Type I Error, or the probability of rejecting a first outcome when it is true;

$\beta$ may be the Type II Error, or the probability of not rejecting a first outcome when it is false; and $\mu_0$ and $\mu_1$ may be the means under the different outcomes. However, embodiments are not so limited and other methods and/or algorithms may be employed to determine a test size for each test.

Process 600 continues next at block 606, a piece of content may be selected from a plurality of possible content. In at least one embodiment, block 606 may employ embodiments of bock 402 of FIG. 4 to select a piece of content.

Continuing at block 608, a test may be determined for the selected content. In at least one embodiment, block 608 may employ embodiments of block 404 of FIG. 4 to determine a test from the plurality of tests.

In some embodiments, the test may be determined from a subset of the plurality of tests. In at least one such embodiment, the subset of tests may be referred to as tests that may be available to be employed with a piece of content. Other tests that are not available (e.g., another subset of the plurality of tests) may be referred to as unavailable and/or start-pending tests. In at least one embodiment, the available subset of tests may include tests that are distinct, separate, and/or different that the tests included in the unavailable subset of tests.

In some embodiments, the number of available tests may be based on a minimum and/or maximum number of tests that can be employed at a given time. For example, out of 10 tests, a maximum of tour tests may be available at any given time. In some embodiments, the number of available tests may be determined based on a number of previously determined preferred outcomes and/or best practices (as determined at block 620), an amount of content provided to the channel (e.g., an average number of pieces of content provided to the channel per day), monitored actions associated with a plurality of content (e.g., an average number of user clicks per day per piece of content), or the like, or any combination thereof.

In any event, process 600 proceeds next to block 610, where an outcome of the test may be determined to be employed with the selected content. In at least one embodiment, block 610 may employ embodiments of block 406 of FIG. 4 to determine an outcome of the test.

Process 600 continues at block 612, where the test and the determined outcome may be provided to a social marketer. In at least one embodiment, the test and the outcome may be provided to the social marketer through a graphical user interface, such as is shown in FIG. 8.

Process 600 proceeds to block 614, where the selected content may be modified based on the determined outcome. In at least one embodiment, modifying the content may include modifying the content based on the contextual recommendations that correspond to the outcome. For example, portions of the content may be added or removed; characteristics of the content may be change, such as font, color, size, style; or the like. However, embodiments are not so limited.

Process 600 continues next at block 616, where the modified content may be provided to the channel. In at least one embodiment, block 616 may employ embodiments of block 408 of FIG. 4 to provide content to the channel.

In any event, process 600 proceeds next to decision block 618, where a determination may be made whether the test size has been reached. In at least one embodiment, the test size may be reached if the current test sample size (i.e., the number of pieces of content that previously employed the test) equals the test size. In at least one of various embodiments, the test may be determined to be complete based at least on a number of pieces of content provided to the channel, e.g., the test size has been reached. If the test size is reached, then process 600 may flow to block 620; otherwise, process 600 may loop to block 606 to select another piece of content.

At block 620, a preferred outcome may be determined based on actions associated with the plurality of content. In at least one embodiment, block 620 may employ embodiments of block 412 of FIG. 4 to determine a preferred outcome.

Process 600 continues next at block 622, where the test may be removed from the plurality of tests. In some embodiments, if a preferred outcome is determined and employed as a "best practices" (e.g., at block 620), then the test may no longer be determined for selected content. In at least one embodiment, the test may be removed from the plurality of tests if the test is complete (e.g., as determined at decision block 618), independent of whether a preferred outcome is determined. In some other embodiments, if a test is removed from the plurality of tests, then another test for another variable having at least another two outcomes may be automatically added to the plurality of tests.

As described above, the test may be one of a subset of the plurality of tests (i.e., an available test). In some embodiments, a completed test may be removed from the subset of the plurality of tests. In at least one embodiment, if a test is removed from the subset of the plurality of tests, then another test of the plurality of tests, such as a start-pending test (i.e., from another subset of the plurality of tests), may be automatically added to the subset of the plurality of tests (i.e., made available). In some embodiments, determining which test to add to the subset of tests may be based on a test generation date and/or time, a predetermined; test priority level, a test start schedule, or the like.

In some other embodiments, a removed test may re-employed by adding the removed test back into the plurality of tests. A test to re-employing may be selected automatically and/or manually. In some embodiments, tests may be scheduled for re-employment randomly, periodically, at predetermined times, or the like. In other embodiments, tests may be re-employed based on monitored actions associated with the content. For example, assume a test regarding sports content is removed item the plurality of tests. If a number of clicks and/or click averages on sports content drops below a predetermined threshold, then the test may be re-employed.

In some other embodiments, the test may not be removed, but may be modified to includes at least one different outcome. In at least one embodiment, the outcome that is determined to be a preferred outcome (at block 620) may remain associated with the test, but a new outcome may be associated with the test. Embodiments of process 600 may be iteratively performed for one or more tests to dynamically modify a playbook of contextual recommendations over time. This iterative process may enable different outcomes to be preferred at different points in time depending on the preferences/monitored actions of the user.

After block 622, process 600 may loop to block 606 to select another piece of content.

It will be understood that each, block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without, departing from the scope or spirit of the invention.

Accordingly, blocks of the flowchart illustration support combinations of means for performing the specified actions, combinations of steps for performing the specified actions and program instruction means for performing the specified, actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Use Case Embodiments

Figure 7:
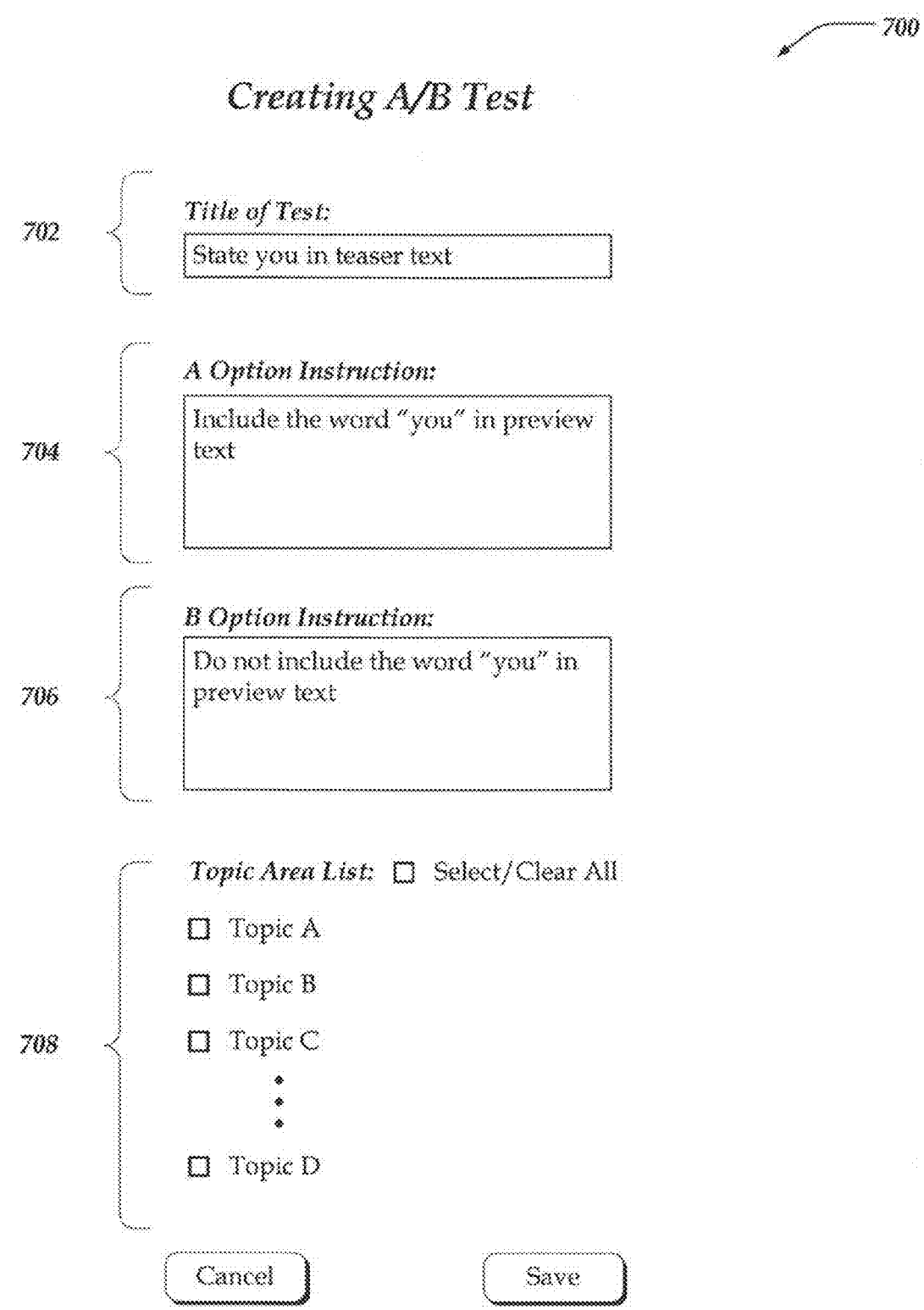
FIG. 7 shows a use case illustration of an embodiment of a graphical user interface that may be employed to generate a contextual recommendation test.

FIG. 7 shows a use case illustration of an embodiment of a graphical user interface that may be employed to generate a contextual recommendation test. Interface 700 may enable a marketing administrator to create a test, such as an A/B test. Interface 700 may include title 702. outcome 704, and outcome 706. Title 702 may include a text box where the marketing administrator can enter a title and/or identifier of the test. Outcomes 704 and 706 may include text boxes where the marketing administrator can enter instructions, i.e., the contextual recommendations, for each outcome associated with the test.

Interface 700 may also include topics 708. As illustrated, topics 708 may include a plurality of different topics and corresponding check boxes. Topics 70S may enable the marketing administrator to select which features and/or topics of content the test may be determined (e.g., at block 404 of FIGURE). After providing adequate information to create the test, the marketing administrator can save the test, which may enable the test to be selected/determined at block 404 of FIG. 4.

Although interface 700 illustrates text boxes and check boxes for input, embodiments are not so limited; rather other forms, types/methods of input, or the like may be employed. For example, in other embodiments, outcomes 704 and 706 may include buttons that, when activated, open separate windows for the marketing administrator to enter outcomes.

FIG. 8 shows a use case illustration of an embodiment of a graphical user interface that may be employed to select contextual recommendations to apply to content. In at least one embodiment, interlace 800 may be employed after a piece of content is selected (e.g., at block 402 of FIG. 4) and a test/outcome is determined (e.g., at blocks 404 and 406 of FIG. 4). In this illustration, the content may be a preview of and a link to a news article. Interface 800 may include channel 802. Channel 802 may include a text box (or other method for selecting a channel) where a marketing administrator can input a channel for providing the content. In other embodiments, the channel may be determined based on the test and outcome as determined at blocks 404 and 406 of FIG. 4.

Interface 800 may also include test 804. Test 804 may include a title and/or other identifier of the test (as determined at block 404 of FIG. 4). Test 804 may also include an outcome of the test (as determined at block 406 of FIG. 4). Interface 800 may include option 806, which may enable the marketing administrator to opt out of the test. In some embodiments, the content may be determined to be an outlier or other type of content that, if included with, the test, may result in inaccurate metrics for the outcome. For example, if the content includes breaking, news about the death of a celebrity, then an unexpectedly higher number of users may click on the content. This high number of clicks may be the result of the news, rather than the success of the outcome (i.e., the contextual recommendation, employed with the content).

Interface 800 may also include preferred outcomes 808. Preferred outcomes 808 may include those outcomes/contextual recommendations of previous tests for similar content. As described above, these preferred outcomes may be dynamically tailored, to a type of the content.

Content 810 may include the selected content and/or mechanisms that may enable the marketing administrator to add, remove, modify, or the like, the content. For example, the font color, type, style, size, or the like may be modified. Additionally, one or more images or additional images may be included with the content. As illustrated in FIG. 8, the outcome is to include the word "you" in the teaser text. However, the outcome may include other contextual recommendations, such as, for example a poll. Examples of content that employ a poll are shown in Table 1.

TABLE 1

Content that includes a poll

Where was the ghost hunter killed on tonight's episode of Show_A?
[a] in a castle
[b] in a mansion
Clickheretofindout
Is the Celebrity A the new Celebrity B? Clickheretofindoutwhy
A. Yeah, buddy!
B. No way!
C. Celebrity A not as annoying as Celebrity B, but he's getting there . . .
Which song from the Halloween episode do you love most?
A. "What You Want"
B. Firestorm
C. "Just Dance"
D. "Cordial Invitation"
E. "Pretty Little Neighbor"
Clickheretofindoutourfavorite
My favorite look was:
[a] The Aftermath
[b] Mystery Solver
Clickheretoseethenewlooks Examples of content that do not employ a poll are shown in Table 2.

TABLE 2

Content that does not include a poll

Contestants are getting dropped left and right!
Clickheretofindoutthelatestvictim
Don't miss what's hot on TV this week! Clickheretoseewhat'son
Are you missing the sassy stage siren, Celebrity D? You can catch her on next weeks episode of Show_B! Clickheretofindoutwhat happenedlastnight
Episode 6 sure had excellent bonfire tunes! Clickheretofindoutwhat elseEpisode6hadinstore Interface 890 may also include schedule 812, which may enable the marketing administrator in select a schedule for when to provide the content to the channel.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method for providing content to a plurality of users over a network, wherein at least one network device performs actions, comprising:
   selecting a plurality of content to be provided to the plurality of users through a channel for distribution of content;
   determining a test for a variable having at least two outcomes, wherein each outcome corresponds to a different contextual recommendation to employ with a piece of content;
   determining one of the at least two outcomes to employ with each piece of the selected content;
   providing each piece of the selected content to the channel based on the contextual recommendation corresponding to the determined outcome; and
   removing the test from a plurality of tests and re-employing the removed test by automatically adding the removed test to the plurality of tests based on other monitored actions associated with the plurality of content.

2. The method of claim 1, further comprising:
   determining a first metric for a first outcome of the at least two outcomes based on actions performed on a subset of the plurality of content that employed the first outcome;
   determining a second metric for a second outcome of the at least two outcomes based on actions performed on another subset of the plurality of content that employed the second outcome; and
   if a result of a comparison of the first metric and the second metric is above a threshold, determining one of the first outcome and the second outcome as a preferred outcome.

3. The method of claim 1, further comprising:
   analyzing actions associated with each of the plurality of content to determine a metric for each of the at least two outcomes; and
   determining a preferred outcome from the at least two outcomes based on a comparison of the metric for each of the at least two outcomes.

4. The method of claim 1, further comprising:
   determining a preferred outcome for the test from the at least two outcomes based on monitored actions associated with each of the plurality of content, wherein the test is determined from the plurality of tests;
   removing the test from the plurality of tests; and
   re-employing the removed test by automatically adding the removed test to the plurality of tests based on the other monitored actions associated with the plurality of content.

5. The method of claim 1, further comprising:
   removing a completed test from the plurality of tests; and
   automatically adding another test for another variable having at least another two outcomes to the plurality of tests.

6. The method of claim 1, further comprising:
   selecting the test from a first subset of the plurality of tests, wherein the first subset of the plurality of tests includes tests available for selection and a second subset of the plurality of tests includes tests unavailable for selection;
   determining if the selected test is complete based at least on a number of pieces of the selected content provided to the channel; and
   if the selected test is complete, enabling actions, including:
      removing the test from the first subset of the plurality of tests; and
      automatically adding another test from the second subset of the plurality of tests to the first subset of the plurality of tests.

7. The method of claim 1, wherein determining the one of the at least two outcomes, further comprises:
   randomly selecting the one of the at least two outcomes such that a number of times that each of the least two outcomes is selected is substantially similar.

8. The method of claim 1, wherein providing each piece of the selected content to the channel, further comprises:
   modifying at least one piece of the selected content based on the contextual recommendation corresponding to the outcome determined for the at least one piece of the selected content; and
   providing the modified at least one piece of the selected content to the channel.

9. A system for providing content to a plurality of users over a network, comprising:
   at least one network device, comprising:
   a memory or storing data and instructions;
   a processor that executes the instructions to enable actions, comprising:
      selecting a plurality of content to be provided to the plurality of users through a channel for distribution of content;
      determining a test for a variable having at least two outcomes, wherein each outcome corresponds to a different contextual recommendation to employ with a piece of content;
      determining one of the at least two outcomes to employ with each piece of the selected content;
      providing each piece of the selected content to the channel based on the contextual recommendation corresponding to the determined outcome; and
      removing the test from a plurality of tests and re-employing the removed test by automatically adding the removed test to the plurality of tests based on other monitored actions associated with the plurality of content.

10. The system of claim 9, further comprising:
    determining a first metric for a first outcome of the at least two outcomes based on actions performed on a subset of the plurality of content that employed the first outcome;
    determining a second metric for a second outcome of the at least two outcomes based on actions performed on another subset of the plurality of content that employed the second outcome; and
    if a result of a comparison of the first metric and the second metric is above a threshold, determining one of the first outcome and the second outcome as a preferred outcome.

11. The system of claim 9, further comprising:
    analyzing actions associated with each of the plurality of content to determine a metric for each of the at least two outcomes; and
    determining a preferred outcome from the at least two outcomes based on a comparison of the metric for each of the at least two outcomes.

12. The system of claim 9, further comprising:
    determining a preferred outcome for the test from the at least two outcomes based on monitored actions associated with each of the plurality of content, wherein the test is determined from the plurality of tests;
removing the test from the plurality of tests; and
re-employing the removed test by automatically adding the removed test to the plurality of tests based on the other monitored actions associated with the plurality of content.

13. The system of claim 9, further comprising:
removing a completed test from the plurality of tests; and
automatically adding another test for another variable having at least another two outcomes to the plurality of tests.

14. The system of claim 9, further comprising:
selecting the test from a first subset of the plurality of tests, wherein the first subset of the plurality of tests includes tests available for selection and a second subset of the plurality of tests includes tests unavailable for selection;
determining if the selected test is complete based at least on a number of pieces of the selected content provided to the channel; and
if the selected test is complete, enabling actions, including:
removing the test from the first subset of the plurality of tests; and
automatically adding another test from the second subset of the plurality of tests to the first subset of the plurality of tests.

15. The system of claim 9, wherein determining the one of the at least two outcomes, further comprises:
randomly selecting the one of the at least two outcomes such that a number of times that each of the least two outcomes is selected is substantially similar.

16. The system of claim 9, wherein providing each piece of the selected content to the channel, further comprises:
modifying at least one piece of the selected content based on the contextual recommendation corresponding to the outcome determined for the at least one piece of the selected content; and
providing the modified at least one piece of the selected content to the channel.

17. A processor readable non-transitory storage media that includes instructions for providing content to a plurality of users over a network, wherein the execution of the instructions by a processor enables actions, comprising:
selecting a plurality of content to be provided to the plurality of users through a channel for distribution of content;
determining a test for a variable having at least two outcomes, wherein each outcome corresponds to a different contextual recommendation to employ with a piece of content;
determining one of the at least two outcomes to employ with each piece of the selected content;
providing each piece of the selected content to the channel based on the contextual recommendation corresponding to the determined outcome; and
removing the test from a plurality of tests and re-employing the removed test by automatically adding the removed test to the plurality of tests based on other monitored actions associated with the plurality of content.

18. The media of claim 17, further comprising:
determining a first metric for a first outcome of the at least two outcomes based on actions performed on a subset of the plurality of content that employed the first outcome;
determining a second metric for a second outcome of the at least two outcomes based on actions performed on another subset of the plurality of content that employed the second outcome; and
if a result of a comparison of the first metric and the second metric is above a threshold, determining one of the first outcome and the second outcome as a preferred outcome.

19. The media of claim 17, further comprising:
analyzing actions associated with each of the plurality of content to determine a metric for each of the at least two outcomes; and
determining a preferred outcome from the at least two outcomes based on a comparison of the metric for each of the at least two outcomes.

20. The media of claim 17, further comprising:
determining a preferred outcome for the test from the at least two outcomes based on monitored actions associated with each of the plurality of content, wherein the test is determined from the plurality of tests;
removing the test from the plurality of tests; and
re-employing the removed test by automatically adding the removed test to the plurality of tests based on the other monitored actions associated with the plurality of content.

21. The media of claim 17, further comprising:
removing a completed test from the plurality of tests; and
automatically adding another test for another variable having at least another two outcomes to the plurality of tests.

22. The media of claim 17, further comprising:
selecting the test from a first subset of the plurality of tests, wherein the first subset of the plurality of tests includes tests available for selection and a second subset of the plurality of tests includes tests unavailable for selection;
determining if the selected test is complete based at least on a number of pieces of the selected content provided to the channel; and
if the selected test is complete, enabling actions, including:
removing the test from the first subset of the plurality of tests; and
automatically adding another test from the second subset of the plurality of tests to the first subset of the plurality of tests.

23. The media of claim 17, wherein determining the one of the at least two outcomes, further comprises:
randomly selecting the one of the at least two outcomes such that a number of times that each of the least two outcomes is selected is substantially similar.

24. The media of claim 17, wherein providing each piece of the selected content to the channel, further comprises:
modifying at least one piece of the selected content based on the contextual recommendation corresponding to the outcome determined for the at least one piece of the selected content; and
providing the modified at least one piece of the selected content to the channel.

25. The method of claim 1, wherein the test includes a test size that corresponds to a minimum threshold number of pieces of content and the test size is based on a predetermined statistical confidence level for determining a preferred outcome from the at least two outcomes.

26. The system of claim 9, wherein the test includes a test size that corresponds to a minimum threshold number of pieces of content and the test size is based on a predetermined statistical confidence level for determining a preferred outcome from the at least two outcomes.

27. The media of claim 17, wherein the test includes a test size that corresponds to a minimum threshold number of pieces of content and the test size is based on a predetermined statistical confidence level for determining a preferred outcome from the at least two outcomes.

* * * * *

UNITED STATES PATENT AND TRADEMARK OFFICE
CERTIFICATE OF CORRECTION

| | |
|---|---|
| PATENT NO. | : 8,612,375 B2 |
| APPLICATION NO. | : 13/673102 |
| DATED | : December 17, 2013 |
| INVENTOR(S) | : Weinstein et al. |

It is certified that error appears in the above-identified patent and that said Letters Patent is hereby corrected as shown below:

In the Specification

In Column 1, Line 32, delete "may torn" and insert -- may turn --, therefor.

In Column 2, Line 4, delete "use ease" and insert -- use case --, therefor.

In Column 3, Line 44, delete "hot" and insert -- not --, therefor.

In Column 4, Line 58, delete "embodiment" and insert -- embodiment, --, therefor.

In Column 5, Line 25, delete "application," and insert -- application --, therefor.

In Column 5, Line 29, delete "life." and insert -- like. --, therefor.

In Column 5, Line 33, delete "Hypertext" and insert -- HyperText --, therefor.

In Column 6, Line 55, delete "OS-1," and insert -- DS-1, --, therefor.

In Column 7, Line 19, delete "that, may" and insert -- that may --, therefor.

In Column 7, Line 20, delete "network," and insert -- network --, therefor.

In Column 7, Line 59, delete "content," and insert -- content --, therefor.

In Column 8, Line 26, delete "arm their" and insert -- and their --, therefor.

In Column 8, Line 58, delete "disclose aft" and insert -- disclose an --, therefor.

In Column 9, Line 2, delete "interlace" and insert -- interface --, therefor.

Signed and Sealed this
Twentieth Day of May, 2014

Michelle K. Lee
*Deputy Director of the United States Patent and Trademark Office*

CERTIFICATE OF CORRECTION (continued)

U.S. Pat. No. 8,612,375 B2

In Column 9, Line 10, delete "abase" and insert -- a base --, therefor.

In Column 9, Line 55, delete "interlace" and insert -- interface --, therefor.

In Column 9, Lines 63-64, delete "headset or" and insert -- headset, or --, therefor.

In Column 10, Line 5, delete "interlace" and insert -- interface --, therefor.

In Column 10, Line 59, delete "content or my" and insert -- content, or any --, therefor.

In Column 11, Line 65, delete "input/output," and insert -- input/output --, therefor.

In Column 12, Line 23, delete "digital," and insert -- digital --, therefor.

In Column 12, Line 42, delete "device 300." and insert -- device 200. --, therefor.

In Column 13, Line 7, delete "IPSee" and insert -- IPSec --, therefor.

In Column 14, Line 8, delete "contest" and insert -- content --, therefor.

In Column 14, Lines 11-12, delete "editorially-curated" and insert -- editorially-curated --, therefor.

In Column 14, Line 23, delete "apiece" and insert -- a piece --, therefor.

In Column 14, Line 60, delete "tire outcomes" and insert -- the outcomes --, therefor.

In Column 15, Line 25, delete "die" and insert -- the --, therefor.

In Column 15, Line 42, delete "associated," and insert -- associated --, therefor.

In Column 15, Line 52, delete "referred," and insert -- referred --, therefor.

In Column 16, Line 23, delete "recommendation," and insert -- recommendation --, therefor.

In Column 17, Line 4, delete "thereof" and insert -- thereof, --, therefor.

In Column 17, Line 40, delete "other," and insert -- other --, therefor.

In Column 18, Line 3, delete "between," and insert -- between --, therefor.

In Column 18, Line 49, delete "test, size" and insert -- test size --, therefor.

In Column 19, Line 17, delete "apiece" and insert -- a piece --, therefor.

In Column 19, Line 20, delete "bock" and insert -- block --, therefor.

CERTIFICATE OF CORRECTION (continued)
U.S. Pat. No. 8,612,375 B2

In Column 19, Line 37, delete "tour" and insert -- four --, therefor.

In Column 19, Line 62, delete "font," and insert -- font --, therefor.

In Column 20, Line 48, delete "item the" and insert -- from the --, therefor.

In Column 21, Lines 17-18, delete "without," and insert -- without --, therefor.

In Column 21, Line 37, delete "title 702." and insert -- title 702, --, therefor.

In Column 21, Line 60, delete "interlace" and insert -- interface --, therefor.

In Column 22, Line 10, delete "with, the" and insert -- with the --, therefor.

In Column 22, Line 12, delete "breaking," and insert -- breaking --, therefor.

In Column 22, Line 16, delete "recommendation," and insert -- recommendation --, therefor.

In Column 23, Line 2, delete "in select" and insert -- to select --, therefor.